United States Patent Office 3,328,245
Patented June 27, 1967

3,328,245
METHODS OF USE OF TETRAHYDROISO-
QUINOLINE ANTITUSSIVE
Arnold Brossi, Verona, N.J., and Alfred Rheiner, Jr.,
Binningen, Switzerland, assignors to Hoffmann-La
Roche Inc., Nutley, N.J., a corporation of New Jersey
No Drawing. Filed Mar. 22, 1965, Ser. No. 441,843
Claims priority, application Great Britain, Mar. 31, 1964,
13,137/64
3 Claims. (Cl. 167—55)

This invention relates, in general, to novel pharmaceutical compositions. More particularly, the invention relates to novel antitussive compositions and to the use thereof.

The antitussive compositions of this invention contain, as the active ingredient thereof, either dl-1-(2',4',5'-trichlorophenethyl) - 2 - methyl - 6,7 - dimethoxy - 1,2,3,4-tetrahydroisoquinoline or (+) - 1 - (2',4',5' - trichlorophenethyl) - 2 - methyl - 6,7 - dimethoxy - 1,2,3,4 - tetrahydroisoquinoline. In the alternative, the compositions can contain a medicinally acceptable acid addition salt of the dl- or (+) - 1 - (2',4',5' - trichlorophenethyl) - 2 - methyl-6,7 - dimethoxy - 1,2,3,4 - tetrahydroisoquinoline. As used herein, the expression, "medicinally acceptable acid addition salt" denotes a salt of the base with a medicinally acceptable acid.

The active ingredient of the present compositions can be readily prepared by any one of several methods. In one such preparative method, 2-(β-acetamido-ethyl)-4,5-dimethoxyacetophenone is condensed with 2,4,5-trichlorobenzaldehyde to form 2 - (2' - acetamido - ethyl) - 4,5 - dimethoxy - (2",4",5" - trichlorobenzylidene) - acetophenone; subsequently cyclizing the 2-(β-acetamido-ethyl)-4,5 - dimethoxy - (2",4",5" - trichlorobenzylidene) - acetophenone, for example, with a mineral acid, to form the mineral acid salt of 1 - (2',4',5' - trichlorostyryl) - 6,7 - dimethoxy-3,4-dihydroisoquinoline; thereafter, reducing the cyclization product to form the acid addition salt of dl-1-(2',4',5' - trichlorophenethyl) - 6,7 - dimethoxy - 1,2,3,4-tetrahydroisoquinoline; converting the reduction product into the free base, subsequently N-methylating the free base and, if desired, converting the dl-1-(2',4',5'-trichlorophenethyl) - 2 - methyl - 6,7 - dimethoxy - 1,2,3,4 - tetrahydroisoquinoline into an acid addition salt. In the alternative, (+) - 1 - (2',4',5' - trichlorophenethyl) - 2-methyl - 6,7 - dimethoxy - 1,2,3,4 - tetrahydroisoquinoline can be obtained from the racemic base by conventional resolution procedures. For the sake of completeness, this preparative method will be described, in full detail, in the working examples which follow hereinafter.

As indicated heretofore, the pharmaceutically active ingredient which is present in the compositions of this invention can be prepared in several other ways. Thus, in addition to the preferred preparative method, described heretofore, 1 - (2',4',5' - trichlorophenethyl) - 2 - methyl-6,7-dimethoxy-1,2,3,4-tetrahydroisoquinoline can be produced by condensing homoveratrylamine with β-(2,4,5-trichlorophenyl)-propionic acid, cyclizing the acid amide, thus produced, to form the corresponding 1-(phenethyl)-3,4-dihydroisoquinoline, reducing the latter compound and N-methylating the reduction product.

In a third preparative method, the active ingredient of the presently claimed composition can be obtained by condensing a 1,2 - dimethyl - 6,7 - dimethoxy - 3,4 - dihydroisoquinolinium salt, such as, a halide, the methyl sulfate, or the like, with 2,4,5-trichlorobenzaldehyde; and hydrogenating the condensation product.

As indicated heretofore, the compositions of this invention contain the dl- or the (+)-1-(2',4',5'-trichlorophenethyl) - 2 - methyl - 6,7 - dimethoxy - 1,2,3,4 - tetrahydroisoquinoline either in the form of the free base or in the form of a medicinally acceptable acid addition salt. Included among the salts which can be used in the practice of the invention are salts of the base with conventional medicinally acceptable inorganic acids, such as, hydrochloric acid, hydrobromic acid, sulfuric acid, nitric acid, phosphoric acid, etc. as well as salts of the base with conventional medicinally acceptable organic acids, such as, citric acid, tartaric acid, maleic acid, fumaric acid, etc. These compounds, when embodied in some suitable pharmaceutical or medicinal carrier, are useful as antitussive agents.

In carrying out this invention, the pharmaceutically active ingredient, named heretofore, is formulated into a composition which is suitable for enteral, for example, oral, or parenteral administration. In preparing such compositions, there can be employed any of the various adjuvant or excipient materials customarily employed in the art. These adjuvants or excipients include, for example, inert substances, such as, water, gelatine, lactose, starches, magnesium stearate, talc, vegetable oils, gums, polyalkylene glycols, petroleum jellies, as well as many of other compatible materials usually used in the preparation of medicaments. The present compositions can be provided in solid dosage form, for example, as tablets, dragees, suppositories or capsules, etc. Moreover, the present compositions can be provided in liquid dosage form, such as, solutions, suspensions, emulsions, syrups, etc. If desired, the compositions can be sterilized and/or they can contain other additives, such as, preservatives, stabilizers, wetting agents, emulsifying agents, salts for varying the osmotic pressure, buffers, etc. Furthermore, the compositions can contain therapeutically useful compounds in addition to antitussive active 1 - (2',4',5' - trichlorophenethyl) - 2-methyl - 6,7 - dimethoxy - 1,2,3,4 - tetrahydroisoquinoline compound. Conventional methods and techniques are employed in formulating all of the various dosage forms embodied within the scope of the present invention.

The quantity of the active 1-(2',4',5'-trichlorophenethyl-) - 2 - methyl - 6,7 - dimethoxy - 1,2,3,4 - tetrahydroisoquinoline compound which is incorporated into the various compositions of the invention is variable within rather wide limits. For example, in the formulation of tablets, dragees and ampuls for injection, there will be used from about 5 mg. to about 100 mg. of the active ingredient. The tablets, dragees and ampuls for injection which are prepared in the preferred practice of the invention contain from about 10 mg. to about 50 mg. of the active tetrahydroisoquinoline compound. When provided in the form of a solution, the active tetrahydroisoquinoline compound, generally in the form of an acid addition salt, will comprise from about 0.5% to about 4.0%, and preferably, from about 1.0% to about 3.0%, of the weight of such solution. Moreover, when the compositions of this invention are provided in the form of a syrup, such syrup will contain from about 0.1% to about 4.0%, and, preferably, from about 0.5% to 2.0%, by weight of the active tetrahydroisoquinoline ingredient, generally in the form of an acid addition salt.

The frequency with which the compositions of this invention are administered to a patient requiring antitussive therapy will depend, to a great extent, upon the needs and requirements of the patient as determined by the prescribing physician. In general, it has been found that the compositions of this invention can be administered, at regular intervals, to provide up to about 100 mg. daily of the active tetrahydroisoquinoline ingredient. In a majority of instances, the daily administration of less than 100 mg. will suffice for the intended purpose. Thus, for example, in the case of a tablet or capsule containing 10 mg. of the active ingredient, one or two such tablets or capsules can be administered up to four times a day. In the case of a tablet or capsule containing 25 mg. of the active ingredient, one such tablet or capsule can be administered up to four times a day or two such tablets or capsules can be administered up to two times a day. The compositions of the invention, in liquid form, will be administered with any desired regularity to provide up to about 100 mg. of the active tetrahydroisoquinoline compound per day.

It has been determined that the compositions manifest marked and sustained antitussive activity when tested by the procedure intitled "A Method for the Evaluation of Antitussive Agents in the Unanesthetized Dog" described in the Journal of Pharmacology and Experimental Therapeutics, volume 108, No. 2, June 1953, pages 217 to 222, inclusive. This test method involves the inducement of a cough by the electrical stimulation of the trachea through previously implanted copper electrodes into the tracheal submucosa. The antitussive activity of the product is, according to this test method, evaluated on the basis of percent of inhibition of the incidence of the induced cough. In tests carried out on the preferred compositions of the invention, that is, on compositions containing (+) - 1 - (2',4',5' - trichlorophenethyl) - 2 - methyl - 6,7-dimethoxy-1,2,3,4-tetrahydroisoquinoline, it was found that there was a relatively slow onset of action but a complete inhibition of the cough and a long duration of activity. For example, when administered, orally, at 4 mg./kg., the maximum inhibition provided by the active ingredient was about 44%, with a duration of action of three hours. At 8 m../kg., oral administration, there was obtained complete inhibition of the cough response and duration of action was about six hours.

For a fuller understanding of the nature and objects of this invention, reference may be had to the following examples which are given merely as further illustrations of the invention and are not to be construed in a limiting sense.

*Example 1*

In this example, there was produced a mixture of 20.0 grams of dl-1-(2',4',5'-trichlorophenethyl)-2-methyl-6,7-dimethoxy-1,2,3,4-tetrahydroisoquinoline, 25.0 grams of potato starch and 30.0 grams of lactose. This mixture was wetted, using 15.0 grams of a 4% aqueous solution of gelatin. The weted mixture was, subsequently, granulated, following which the granulate was dried. Thereafter, talc was added to the dry granulate and the mixture was compressed into tablets of 80 mg. weight containing 20 mg. of the active ingredient.

For the sake of completeness, the preparation of racemic 1 - (2',4',5' - trichlorophenethyl) - 2 - methyl-6,7 - dimethoxy - 1,2,3,4 - tetrahydroisoquinoline and the (—)- and (+)-antipodes thereof, is given below, although it should be understood that neither the compound, nor the process for its preparation, comprises part of this invention.

70.7 grams of 2,4,5-trichlorobenzaldehyde and 90.2 grams of 2-(β-acetamidoethyl)-4,5-dimethoxy-acetophenone were dissolved in 280 ml. of methanol. To the resulting solution there was added 33.4 ml. of 3 N NaOH, whereupon said solution turned deep red. After about thirty minutes, water was added to the solution until a slight turbidity developed. A yellow product crystallized which was collected on a Büchner-funnel and washed with methanol-water (1:1). There was obtained crude 2 - (2' - acetamidoethyl) - 4,5 - dimethoxy - (2'',4'',5''-trichlorobenzylidene)-acetophenone of melting point 163° to 166° C. Upon recrystallization, the compound melted at 117° to 118° C.

135 grams of the crude acetophenone product, produced as described in the preceding paragraph, was heated, with stirring, under reflux conditions in admixture with 478 ml. of concentrated hydrochloric acid and 407 ml. of water. Glacial acetic acid (140 ml.) was then added to the mixture, in small portions, until all of the solid material present had dissolved, following which the solution was kept at reflux for another two hours. After cooling in an ice bath, the orange-red crystals which formed were filtered off with suction and washed with 20% hydrochloric acid. The wet material was recrystallized from methanol-ether. There was obtained, after drying in vacuo, 1 - (2',4',5' - trichlorostyryl) - 6,7 - dimethoxy-3,4-dihydroisoquinoline hydrochloride, melting at 222–226° C., with decomposition.

80 grams of the hydrochloride salt described in the preceding paragraph was hydrogenated in 3 liters of methanol in the presence of 710 mg. of platinum oxide at room temperature and atmospheric pressure until the theoretical amount of hydrogen had been consumed. This took about nine hours. After filtration, evaporation in vacuo and crystallization from methanol-ether, there was obtained dl - (2',4',5' - trichlorophenethyl) - 6,7-dimethoxy-1,2,3,4-tetrahydroisoquinoline hydrochloride, melting point at 225–228° C. Recrystallization from methanol-ether did not change the melting point.

56.3 grams of the hydrochloride salt described in the preceding paragraph was distributed in a separating funnel between chloroform and 2-N sodium hydroxide solution to obtain dl - 1 - (2',4',5' - trichlorophenethyl)-6,7-dimethoxy-1,2,3,4-tetrahydroisoquinoline as the free base. Thereafter, 44.5 ml. of 100% formic acid and 44.5 ml. of 40% aqueous formaldehyde were added to the base, following which the mixture was heated at reflux temperature for forty-five minutes. Evaporation of the yellow solution in vacuo, distribution between methylene chloride and 2-N aqueous ammonium hydroxide and crystallization from methanol yielded 49.5 grams of dl-1-(2',4',5' - trichlorophenethyl)-2 - methyl-6,7-dimethoxy-1,2,3,4-tetrahydroisoquinoline of melting point 103° to 105° C. Recrystallization of this substance from methanol, yielded the compound melting point at 106° to 107° C. Melting point of the hydrochloride (upon recrystallization from methanol-ether) was 212° to 213° C.

30 grams of dl-1-(2',4',5'-trichlorophenethyl)-2-methyl-6,7-dimethoxy-1,2,3,4-tetrahydroisoquinoline, obtained as described in the preceding paragraphs, and 28.5 grams of (—)-dibenzoyl-D-tartaric acid were dissolved in 250 ml. of acetone. Thereafter, 350 ml. of ether were added until a slight turbidity persisted. After allowing the solution to stand overnight, a crystalline substance of melting point 130° C. was collected. Recrystallization of this from acetone-methanol (4:1)-ether gave the (—)-dibenzoyl-D-tartrate of (—)-1-(2',4',5'-trichlorophenethyl)-2-methyl-6,7 - dimethoxy-1,2,3,4-tetrahydroisoquinoline having a melting point of 137° to 138° C.; $[\alpha]_D^{23}=-63.5°$ (c.=0.50 in methanol). 13 grams of the above described tartrate was distributed between ether and 2-N aqueous sodium hydroxide to set free the base. The residue obtained by evaporation of the ether was recrystallized from isopropyl ether to obtain (—)-1-(2',4',5'-trichlorophenethyl) - 2 - methyl-6,7-dimethoxy-1,2,3,4-tetrahydroisoquinoline, melting point at 101° to 102° C.; $[\alpha]_D^{24}=-20.3°$ (c.=0.444 in methanol). By fractional crystallization of the mother liquors of the tartrate and processing as described heretofore, an additional quantity of the (—)-base was recovered, melting point 99° to 102° C.; $[\alpha]_D^{24}=-18.5°$ (c.=0.50 in methanol).

From the mother liquor of the crude dibenzoyl-D-tartrate described in the preceding paragraph, the base (14.4 grams) was isolated by distribution between ether and 2-N aqueous sodium hydroxide. An acetone solution of (+)-camphor-10-sulfonic acid (8.98 grams) and ether were added until a weak turbidity appeared. After standing for two days, 16.2 grams of the crude camphor-sulfonic acid salt of (+)-1-(2',4',5'-trichlorophenethyl)-2-methyl - 6,7 - dimethoxy-1,2,3,4-tetrahydroisoquinoline of melting point 160° to 162° had crystallized. Recrystallization of the salt from acetone-ether yielded a product of melting point 162° to 164° C. and $[\alpha]_D^{22}=+24.5°$ (c.=0.50 in methanol).

After distribution of the latter salt between ether and 2-N aqueous sodium hydroxide, there was obtained the (+) - 1 - (2',4',5' - trichlorophenethyl)-2-methyl-6,7-dimethoxy-1,2,3,4-tetrahydroisoquinoline free base which, on recrystallization from methanol, melted at 105° to 106° C. $[\alpha]_D^{25} = +21.6°$ (c.=0.508 in methanol).

*Example 2*

In this example, a solution for oral administration, was prepared by dissolving 21.5 grams of hydrochloride salt of (+) - 1 - (2',4',5'-trichlorophenethyl)-2-methyl-6,7-dimethoxy-1,2,3,4-tetrahydroisoquinoline in a mixture of 150 grams of glycerine, 50 grams of ethanol (96%), 10 grams of 0.1-N hydrochloric acid and 768.5 grams of distilled water.

*Example 3*

In this example, a solution for injection was prepared in the following manner: 5.375 grams of the hydrochloride salt of (+)-1-(2',4',5'-trichlorophenethyl)-2-methyl-6,7 - dimethoxy-1,2,3,4-tetrahydroisoquinoline was dissolved in 900 grams in distilled water. The pH of the resulting solution was adjusted to 3.5 by the addition of 50% aqueous solution of citric acid. Thereafter, sufficient distilled water was added to make 1000 ml. This solution was filled into 1.0 ml. ampuls. The ampuls were heated in an autoclave at a temperature of 120° C. and at one atmosphere gauge pressure for a period of twenty minutes.

*Example 4*

In this example, a syrup was prepared. In producing this syrup, a mixture of 3.75 grams of citric acid, 3.75 grams of sodium citrate and 1.2 grams of sodium benzoate were dissolved in 1100 grams of sugar syrup. To the resulting solution there was added a solution containing 0.1 gram of methanol in 50 grams of 96% ethanol. Subsequently, a solution of 1.075 grams of the hydrochloric acid salt of (+)-1-(2',4',5'-trichlorophenethyl)-2-methyl-6,7 - dimethoxy - 1,2,3,4 - tetrahydroisoquinoline in 100 grams of demineralized water was added to, and dissolved in, the solution. Thereafter, using demineralized water, the syrup was made up to one liter.

We claim:
1. A method which comprises administering, to a patient requiring antitussive therapy, an effective dose of a composition comprising (a) a member selected from the group consisting of dl-1-(2',4',5'-trichlorophenethyl)-2-methyl - 6,7 - dimethoxy-1,2,3,4 - tetrahydroisoquinoline, (+) - 1 - (2',4',5' - trichlorophenethyl)-2-methyl-6,7-dimethoxy-1,2,3,4-tetrahydroisoquinoline and a medicinally acceptable acid addition salt of either and (b) pharmaceutical adjuvant materials.

2. The method of claim 1 wherein the composition containing dl-1-(2',4',5'-trichlorophenethyl)-2-methyl-6,7-dimethoxy-1,2,3,4-tetrahydroisoquinoline is administered in such quantities as to provide up to about 100 mg. of the tetrahydroisoquinoline ingredient per day.

3. The method of claim 1 wherein the composition containing (+)-1-(2',4',5'-trichlorophenethyl)-2-methyl-6,7-dimethoxy-1,2,3,4-tetrahydroisoquinoline is administered in such quantities as to provide up to about 100 mg. of the tetrahydroisoquinoline ingredient per day.

References Cited

FOREIGN PATENTS 862,052    3/1961    England.

ALBERT T. MEYERS, *Primary Examiner.*

SAM ROSEN, *Examiner.*

S. J. SINGER, *Assistant Examiner.*